(12) United States Patent
O'Hagan

(10) Patent No.: US 6,545,742 B2
(45) Date of Patent: *Apr. 8, 2003

(54) LIGHTING SYSTEMS

(76) Inventor: Paul Allan Peter O'Hagan, 69 Waddington Way, Upper Norwood, London, SE19 3UH (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/524,671

(22) Filed: Mar. 13, 2000

(65) Prior Publication Data

US 2002/0008849 A1 Jan. 24, 2002

(30) Foreign Application Priority Data

Mar. 16, 1999 (GB) .............................................. 9906031

(51) Int. Cl.[7] .......................... G03B 21/20; G03B 19/18
(52) U.S. Cl. .......................... 352/199; 352/49; 352/200
(58) Field of Search .............................. 352/44, 45, 49, 352/198, 199, 200, 201, 205; 362/11, 321; 396/322, 323

(56) References Cited

U.S. PATENT DOCUMENTS

| 2,008,938 | A | * | 7/1935 | Tolhurst ...................... 362/321 |
|---|---|---|---|---|
| 2,024,081 | A | * | 12/1935 | Williams ....................... 352/49 |
| 2,323,754 | A | * | 7/1943 | Oliver ........................... 352/49 |
| 2,337,327 | A | * | 12/1943 | Haskin .......................... 352/89 |
| 2,575,270 | A | * | 11/1951 | Harcourt ........................ 352/49 |
| 2,651,233 | A | * | 9/1953 | Tondreau et al. ............ 396/334 |
| 2,671,377 | A | * | 3/1954 | Downes et al. .............. 352/199 |
| 3,158,477 | A | * | 11/1964 | Vlahos ......................... 430/359 |
| 3,362,773 | A | * | 1/1968 | Mihara .......................... 352/44 |
| 4,417,791 | A | * | 11/1983 | Erland et al. .................. 352/45 |
| 4,457,599 | A | * | 7/1984 | Sawicki ......................... 352/89 |
| 4,796,990 | A | * | 1/1989 | Crothers et al. ............... 352/89 |
| 5,331,361 | A | * | 7/1994 | Jones ........................... 354/132 |

FOREIGN PATENT DOCUMENTS

| GB | 2323733 | 9/1998 |
| WO | WO9426057 | 11/1994 |

* cited by examiner

Primary Examiner—Rodney Fuller
(74) Attorney, Agent, or Firm—Cooper & Dunham LLP

(57) ABSTRACT

A lighting system comprises a plurality of switchable light generators the light output from which can be switched 'on' or 'off'. The system further comprises a camera to which light from a scene illuminated by a designated light generator is directed, a scene record inhibitor and a sync. signal generator means which is arranged to synchronise switch operation of the light generators with operation of the record inhibitor. In this manner the camera records light from the scene only when the scene is illuminated by the designated light generator.

22 Claims, 2 Drawing Sheets

LIGHTING SYSTEMS

BACKGROUND

1. Field of the Disclosure

This invention relates to lighting systems and more especially although not exclusively it relates to systems for the lighting of film sets or the like.

2. Description of the Related Art

The film making and photographic industries increasingly rely on post production film editing, using sophisticated purpose-built computerized equipment to produce required results quickly and cost effectively, such as for example equipment sold by Quantel Limited under their registered trade marks HARRY, HENRY or DOMINO.

In order to facilitate the use of some post production film making techniques, such as those using blue screen matts for example, whereby a foreground scene may be efficiently superimposed on a background scene filmed at a different location, lighting systems are required which appropriately illuminate both the foreground scene and a blue screen background. The lighting required to illuminate the blue screen background is ideally uniform, soft and shadow free, whereas the lighting required for foreground illumination is usually harder so that shadows are produced which enhance the appearance and character of a subject. It will be appreciated therefore that the lighting requirements for a blue screen background are seldom similar to the lighting requirements for a foreground scene.

Moreover, ideal foreground lighting almost inevitably adversely affects the background due to 'hot-spots' and/or shadowing, and similarly ideal background lighting usually tends to spill over so as adversely to affect the foreground. Accordingly, known lighting systems for illuminating film sets or the like, tend to be something of a compromise so that neither the blue screen illumination requirements, nor the foreground illumination requirements are fully satisfied.

SUMMARY

It is an object of the present invention to provide a lighting system which will efficiently meet at least two different illumination requirements.

According to the present invention, a lighting system comprises a plurality of switchable light generators, light output from which is arranged to be switchble 'on' or 'off', a camera to which light from a scene illuminated by a designated light generator is directed, a scene record inhibitor and sync. signal generator means which is arranged to synchronize switch operation of the light generators with operation of the record inhibitor so that the camera records light from the scene only when the scene is illuminated by the designated light generator.

There may be provided a plurality of cameras at least one of which is arranged to record light from the scene only when the scene is illuminated by the designated light generator.

The lighting system may comprise a beam sharer, by means of which light from a scene is directed along different paths, a plurality of cameras disposed one in each of the paths for receiving light from the scene via the beam sharer, control means operative to ensure that the cameras are arranged to record in turn light originating from the scene via the beam splitter, a plurality of switchable light generators, light output from each of which is arranged to be independently switchable, 'on' or 'off' and sync. signal generator means arranged to synchronize switch operation of the light generators with operation of the control means so that at least one camera records light from the scene only when the scene is illuminated by a designated light generator.

The beam sharer may be a beam splitter such as a part silvered mirror, which splits the beam and feeds it to different paths, or alternatively it may comprise an optical multiplexer such as an oscillating mirror, which feeds the beam alternately to different paths.

According to one embodiment of the present invention, a lighting system comprises a beam splitter, by means of which light from a scene is directed along different paths, a plurality of cameras disposed one in each of the paths for receiving light from the scene via the beam splitter, control means operatively associated with each of the cameras so that the cameras can be arranged to record in turn light originating from the scene via the beam splitter, a plurality of switchable light generators, designated one for each camera, light output from each of which is arranged to be independently switchable, 'on' or 'off' and sync. signal generator means arranged to synchronize switch operation of the light generators with operation of the control means so that each camera records light from the scene only when the scene is illuminated by its designated light generator.

According to one implementation of this embodiment of the invention, the beam splitter is arranged to direct light along two different paths which lead respectively to two cameras each having operatively associated with it control means, two light generators being provided, one being designated for each camera, which are operated alternately and synchronously with the control means so that light originating from one of the two light generators is recorded by one of the two cameras and light originating from the other of the two light generators is recorded by the other of the two cameras.

It will be apparent that with a lighting system according to this implementation of the present invention, light from the said one of the two light generators may be used to provide background illumination for example, whilst light from the said other of the two light generators is used to provide foreground illumination, so that the said one camera receives background light only and the said other camera receives foreground light only. Thus no lighting compromise is necessary since the illumination requirements for background and foreground can both be filly satisfied without adversely affecting each other.

It will be apreciated that in an alternative system one camera might be arranged to operate effectively only when a scene is illuminated by one designated light generator whilst another camera is arranged to operate effectively only when the scene is illuminated by a plurality of light generators, which plurality may include the said one light generator.

The control means may be shutter means operative to interrupt light fed from the beam splitter to the cameras in turn so that they effectively record sequentially.

The shutter may take any convenient form and for example, be a mechanical shutter or an optical shutter of any suitable type, such as for example, an optical shutter comprising rotating polarized elements.

Alternatively, the control means may comprise electronic switch means effective to inhibit operation of the cameras in turn so that they record sequentially.

The cameras may use film which is exposed by received light to record images, or alternatively they may be electronic cameras which use c.c.d. devices or the like to produce electrical image signals.

The light generators may each comprise a light source the energisation of which is controlled by the sync. signal generator means.

Alternatively the light generators may each comprise a light source and a shutter used to occlude light from the source with which it is associated under control of the sync. signal generator means.

A further possible alternative is a combination of switched light source(s) and switched shutter(s) operated under control of the sync. signal generator means.

A shutter used to occlude light from a light source may be a mechanical shutter such as a rotating apertured disc, for example, or alternatively an electronic shutter such as a shutter comprising a liquid crystal obturator.

The shutter means may comprise an occluder placed in the light path such as a mechanical shutter, e.g. a rotating apertured disc, or alternatively it may comprise an electronic shutter such as a shutter comprising a liquid crystal obturator.

Although one implementation of this invention is eminently suitable for providing background illumination and foreground illumination to facilitate the efficient use of blue screen matt processing techniques, it may equally well be used for other purposes, as will hereinafter be described, such as for providing illuminated scene markers for example.

It is also contemplated that three or more different lighting requirements may be provided for, as determined by the particular application in view, whereby for example, illuminated scene markers, background lighting and foreground lighting may each be provided by a light generator, the light generators being operated sequentially so as to avoid any undesirable interference therebetween.

BRIEF DESCRIPTION OF THE DRAWINGS

One embodiment of the invention will now be described by way of example only with reference to the accompanying drawings in which.

DETAILED DESCRIPTION

Figure 1:
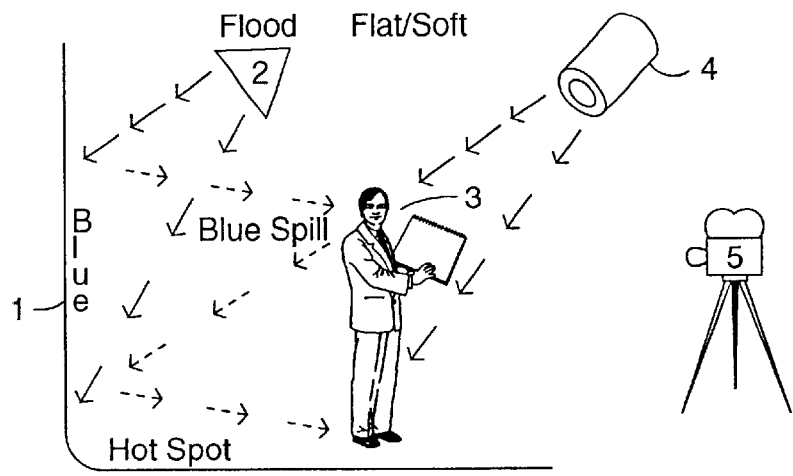
FIG. 1, is a schematic side view of a known lighting system which is used to provide both blue screen background lighting and foreground lighting.

Referring now to FIG. 1, a typical lighting system for matt effects comprises a blue screen background 1, which is illuminated by a floodlight 2, which is chosen to produce soft flat illumination of the blue screen. A foreground subject 3, shown schematically, is illuminated by a spotlight 4, which is much harder and chosen to produce shadowing as necessary in order to define the character of the subject 3, from the viewpoint of a camera 5.

Inevitably undesirable shadowing on the blue screen 1, is produced by the spotlight 4, and similarly blue light spill from the background 1, is undesirably reflected on to the subject 3. It will be appreciated therefore, that scene lighting for matt effect photography or cinamatography tends to be something of a compromise.

Figure 2:
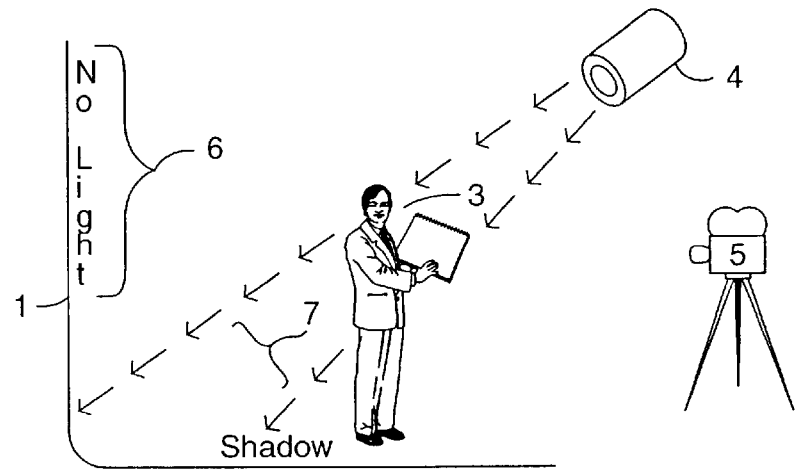
FIG. 2, is a schematic side view of an ideal foreground lighting arrangement.

Referring now to FIG. 2, which shows a system affording ideal foreground illumination and wherein parts corresponding to FIG. 1 bear the same numerical designations, ideal lighting of the subject 3, by the spotlight 4, does not adequately illuminate a portion 6, of the blue screen 1, and undesirable shadows are cast on the blue screen in the region 7.

Figure 3:
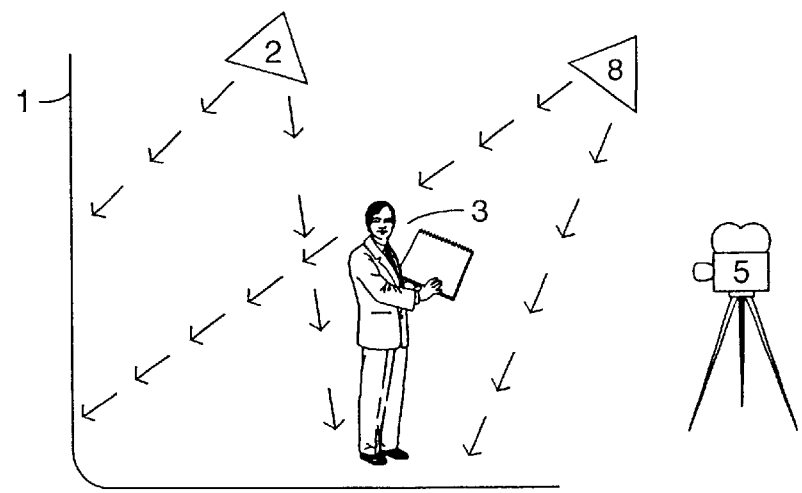
FIG. 3, is a schematic side view of an ideal background lighting arrangement.

Referring now to FIG. 3, which shows a system affording ideal background lighting and wherein parts corresponding to FIG. 1 bear the same numerical designations, ideal lighting for the blue screen 1, is produced by means of an additional floodlight 8, which is not really suitable for illuminating the subject 3, since it is rather too soft and flat and does not provide adequate shadow detail. Accordingly, it will be understood that the normal practice is to choose a lighting arrangement which is something of a compromise and which is therefore not ideal for background or foreground.

Figure 4:
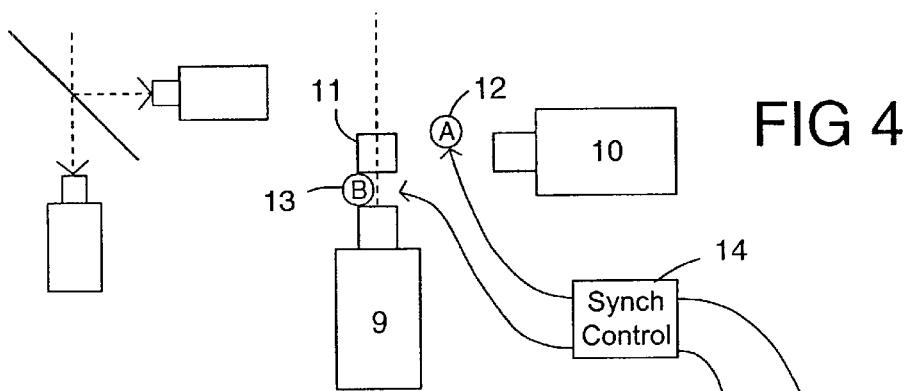
FIG. 4, is a schematic block circuit diagram of a lighting system according to one embodiment of the invention.

In order to achieve the benefits of ideal background lighting and ideal foreground lighting, a lighting system is provided as shown in FIG. 4 comprising two cameras 9 and 10, which are arranged to receive light from a scene to be photographed via a beam splitter 11, which might comprise a part-silvered mirror and which reflects 50% of the scene light to one of the cameras, and passes the remainder of the scene light to the other camera. It should however be understood that in alternative embodiments, any other percentage light split may be appropriate, as for example in a case where one camera is particularly sensitive so that it will operate with a smaller percentage of the available light.

Light from the beam splitter 11, is fed to the cameras 10 and 9, via optical shutters 12 and 13 respectively. The shutters 12 and 13, are operated under control of a sync. signal generator 14, so that light is fed to the cameras 9 and 10, from the beam splitter 11, alternately. The sync. signal generator 14, is also arranged to control a foreground light generator 15, which provides hard lighting as required for illuminating a foreground subject and a background light generator 16, which provides softer lighting suitable for blue screen illumination, the light generators 15 and 16, being controlled by the sync. signal generator 14, so that they illuminate the scene alternately and so that their operation is synchronized with operation of the shutters 12 and 13, whereby when light is fed to the camera 10, from the shutter 12, the scene is illuminated by the foreground light generator 15 and when light is fed to the camera 9, from the shutter 13, the scene is illuminated by the background light generator 16. Thus it will be appreciated that due to this strobe lighting arrangement, the camera 10, receives ideal foreground lighting only and the camera 9, receives ideal blue screen background lighting only.

The frequency of operation of strobe switching as determined by the frequency of the sync. signal generator, is chosen so that detrimental flicker effects are minimized while achieving optimum scene lighting effects, the frequency of operation being much faster than the camera frame speed, and for example, a hundred times or more, faster.

Figure 5:
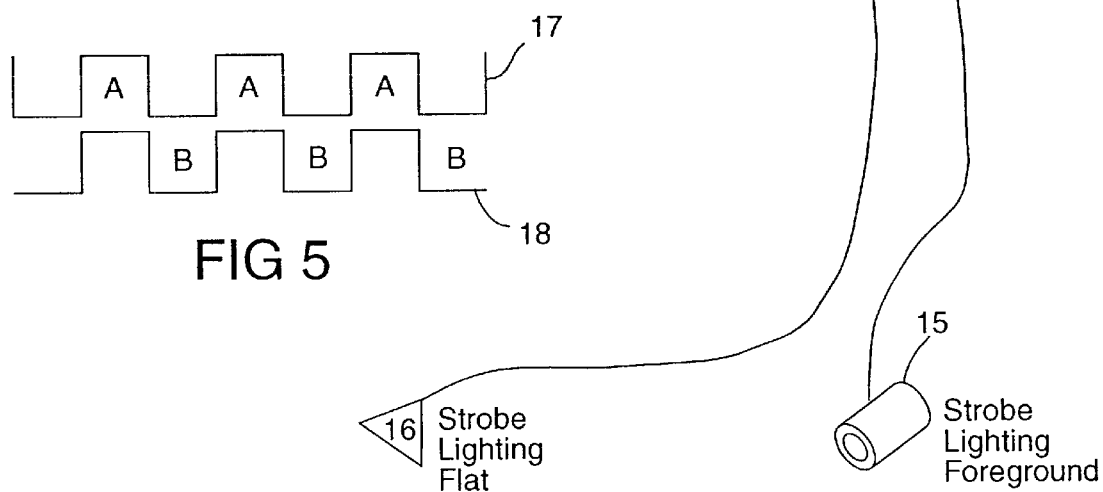
FIG. 5, is a waveform diagram illustrating operation of a part of the system of FIG. 4: and, FIG. 6, is a schematic side view of an alternative use of the system of FIG. 4 for providing illuminated scene markers.

It will be appreciated that it is important to ensure that the light generators 15 and 16 are never "on" together, as shown by waveforms 17 and 18 of FIG. 5, which illustrate operation of the shutters 12 and 13 respectively. It will also be appreciated that the cameras 9 and 10, may embody the shutters 12 and 13. However, in an alternative arrangement, instead of the shutters 12 and 13, the sync. signal generator 14, may be used to inhibit alternately operation of the cameras 10 and 9. The is particularly simple to achieve if the camera is an electronic camera comprising ccd's for image signal production.

Figure 6:
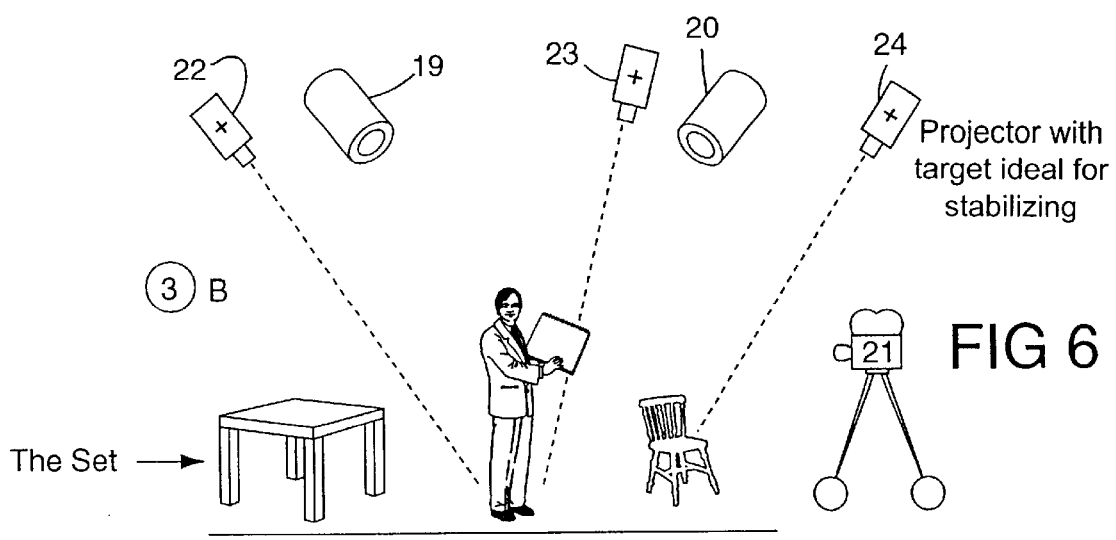

Although as just before described, one implementation of the invention is eminently suitable for facilitating efficient scene lighting for using matt processing techniques, it may also be used to provide scene markers as shown in FIG. 6.

Referring now to FIG. 6, spotlights 19 and 20 may be provided for subject lighting to illuminate the scene as required for a camera 21. In order to provide illuminated scene markers at various locations in the scene, light marker projectors 22, 23 and 24 are provided. The scene lights 19, 20 and the marker projectors 22, 23, 24, are then operated under control of a system which is similar to the arrangement of FIG. 4, so that the scene lights 19, 20, are operated alternately with the scene marker projectors 22, 23, 24, and so that the camera 21, only records during periods when the scene lights 19, 20, are illuminated so that the scene markers are not registered by the camera.

Various modifications may be made to the arrangements herein described and for example, three or more lighting systems may be provided in accordance with the application in view which are operated alternately, for example to provide for scene markers, background lighting and foreground lighting, the lighting being appropriately synchronized with a cameras or cameras. It is also contemplated that future technology may permit the provision of systems which embody extremely fast shutters or the equivalent thereof, which can operate in periods which are short as compared with the time taken for light to travel from a light generator to illuminate a scene and from the scene to the shutter whereby shutter operation during ultra short periods of scene illumination, during which periods the light generator may actually have ceased to emit light, may be possible and it should be appreciated that such systems are within the scope of the present invention as broadly conceived.

What is claimed is:

1. A lighting and camera system comprising a plurality of switchable light generators, light output from which is arranged to be switchable "on" or "off", a plurality of cameras to which light from a scene illuminated by a respective one of the light generators is directed, each camera having a camera frame speed, a scene record inhibitor and a sync. signal generator arranged to synchronize switch operation of the light generators with operation of the record inhibitor so that each camera records light from the scene only when the scene is illuminated by the respective light generator, wherein a frequency of operation of the sync. signal generator is faster than the camera frame speed or speeds.

2. A lighting system as claimed in claim 1, comprising a beam sharer, by which light from a scene is directed along different paths, said plurality of cameras being disposed one in each of the paths for receiving light from the scene via the beam sharer, a controller operative to ensure that the cameras are arranged to record in turn light originating from the scene via the beam sharer, light output from each of the light generators being independently switchable "on" or "off", said sync. signal generator being arranged to synchronize switch operation of the light generators with operation of the controller so that at least one camera records light from the scene only when the scene is illuminated by a designated light generator.

3. A lighting system as claimed in claim 2, wherein the beam sharer is a beam splitter.

4. A lighting system as claimed in claim 2 wherein the beam sharer is an optical multiplexer which feeds the beam alternately to different paths.

5. A lighting system as claimed in claim 1, comprising a beam splitter by which light from the scene is directed along different paths, said plurality of cameras being disposed one in each path for receiving light from the scene via the beam splitter, a controller operatively associated with each of the cameras so that they can be selectively inhibited to record in turn light originating from the scene via the beam splitter, the switchable light generators being designated one for each camera and being arranged to be independently switchable "on" or "off" under control of the sync. signal generator which serves to synchronize switch operation of the light generators with operation of the controller so that each camera records light from the scene only when the scene is illuminated by its designated light generator.

6. A lighting system as claimed in claim 5, wherein the beam splitter is arranged to direct light along two different paths which lead respectively to two said cameras each having operatively associated with it said controller, two light generators being provided, one for each camera, which are arranged to operate alternately any synchronously with the controller so that light originating from one of the two light generators is recorded by one of the two cameras and light originating from the other of the two light generators is recorded by the other of the two cameras.

7. A lighting system as claimed in claim 5, wherein the controller comprises a shutter operative to interrupt light fed via the beam splitter to the cameras in turn so that they effectively record sequentially.

8. A lighting system as claimed in claim 5, wherein the controller comprises an electronic switch effective to inhibit operation of the cameras in turn so that they record sequentially.

9. A lighting system as claimed in claim 5, wherein the beam splitter comprises a part silvered mirror which serves to reflect some light from the scene along one of the paths whilst permitting the passage of another part of light from the scene to another of the paths.

10. A lighting system as claimed in claim 1, wherein the cameras comprise film which is exposed by received light to record images.

11. A lighting system as claimed in claim 1, wherein the cameras are electronic cameras which comprise c.c.d. devices or the like to produce electrical image signals.

12. A lighting system as claimed in claim 1, wherein the light generators each comprise at least one light source, energisation of which is switched "on" or "off" in dependence upon the sync. signal generator.

13. A lighting system as claimed in claim 1, wherein the light generators each comprise a light source and a shutter which is opened or closed to occlude light from the source with which it is associated under control of the sync. signal generator.

14. A lighting system as claimed in claim 1, wherein the scene record inhibitor comprises a shutter which is operated under control of the sync. signal generator means to interrupt light fed to the camera.

15. A lighting system as claimed in claim 1, wherein the scene record inhibitor comprises a switch operated under control of the sync. signal generator to interrupt operation of the camera.

16. A lighting system as claimed in claim 1, wherein the frequency of operation of the sync. signal is at least a hundred times faster than the camera frame speed or speeds.

17. A controller for controlling a plurality of switchable light generators and a scene record inhibitor which inhibits a plurality of cameras to which light from a scene illuminated by a respective one of the light generators is directed, each camera having a camera frame speed, said controller comprising:

outputs for selectively providing synchronizing signals to each of the plurality of switchable light generators; and outputs for providing synchronizing signals to the scene record inhibitor for selectively inhibiting the plurality of cameras, the controller arranged to synchronize operation of the light generators with operation of the record inhibitor so that each camera records light from the scene only when the scene is illuminated by the respective light generator, wherein a frequency of operation of the controller is faster than the camera frame speed or speeds.

18. A controller as recited in claim 17, wherein light is provided to each of the plurality of cameras via a beam sharer by which light from a scene is directed along different paths, the plurality of cameras being disposed one in each of the paths for receiving light from the scene via the beam sharer, wherein the controller controls to ensure that the cameras are arranged to record in turn light originating from the scene via the beam sharer, the light output from each of the light generators being independently switchable "on" or "off" by said controller to synchronize switch operation of the light generators with operation of the record inhibitor so that at least one camera records light from the scene only when the scene is illuminated by a designated light generator.

19. A controller as claimed in claim 17, wherein light is provided to each of the plurality of cameras via a beam splitter by which light from the scene is directed along different paths, the plurality of cameras being disposed one in each path for receiving light from the scene via the beam splitter, wherein the controller controls the cameras so that they can be selectively inhibited to record in turn light originating from the scene via the beam splitter, the switchable light generators being designated one for each camera and being arranged to be independently switchable "on" or "off" by the controller which serves to synchronize switch operation of the light generators with operation of the scene record inhibitor so that each camera records light from the scene only when the scene is illuminated by its designated light generator.

20. A controller as claimed in claim 19, wherein the controller controls a shutter operative to interrupt light fed via the beam splitter to the cameras in turn so that they effectively record sequentially.

21. A controller as claimed in claim 19, wherein the controller controls an electronic switch effective to inhibit operation of the cameras in turn so that they record sequentially.

22. A controller as claimed in claim 17, wherein the frequency of operation of the controller is at least a hundred times faster than the camera frame speed or speeds.

* * * * *